(12) United States Patent
Thenappan et al.

(10) Patent No.: US 9,234,062 B2
(45) Date of Patent: Jan. 12, 2016

(54) PROCESS, PROPERTIES, AND APPLICATIONS OF GRAFT COPOLYMERS

(71) Applicant: Honeywell International Inc., Morristown, NJ (US)

(72) Inventors: Alagappan Thenappan, Hackettstown, NJ (US); Eric Rainal, Morristown, NJ (US); Bruno Ameduri, Montpellier (FR); Frédéric Boschet, Brussels (BE); Noureddine Ajellal, Montpellier (FI); Gerald Lopez, Lunel-Viel (FR)

(73) Assignee: Honeywell International Inc., Morris Plains, NJ (US)

( * ) Notice: Subject to any disclaimer, the term of this patent is extended or adjusted under 35 U.S.C. 154(b) by 365 days.

(21) Appl. No.: 13/713,630

(22) Filed: Dec. 13, 2012

(65) Prior Publication Data

US 2013/0184422 A1 Jul. 18, 2013

Related U.S. Application Data

(60) Provisional application No. 61/570,572, filed on Dec. 14, 2011.

(51) Int. Cl.
| | |
|---|---|
| C08F 214/24 | (2006.01) |
| C08F 259/00 | (2006.01) |
| C08F 259/08 | (2006.01) |
| C08F 259/02 | (2006.01) |
| C08J 5/18 | (2006.01) |

(52) U.S. Cl.
CPC ............. *C08F 214/24* (2013.01); *C08F 259/00* (2013.01); *C08J 5/18* (2013.01); *C08J 2327/12* (2013.01)

(58) Field of Classification Search
CPC .... C08F 214/24; C08F 259/00; C08F 259/02; C08F 259/08
See application file for complete search history.

(56) References Cited

U.S. PATENT DOCUMENTS

| | | | |
|---|---|---|---|
| 3,298,942 A * | 1/1967 | Chapiro et al. ............... | 522/120 |
| 3,442,780 A * | 5/1969 | Levine ............................ | 522/124 |
| 4,146,521 A | 3/1979 | Godfrey | |
| 4,308,359 A | 12/1981 | Buning | |
| 4,385,130 A * | 5/1983 | Molinski et al. ............... | 521/31 |
| 4,472,557 A | 9/1984 | Kawashima et al. | |
| 4,481,306 A * | 11/1984 | Markus et al. ................ | 521/31 |
| 4,506,035 A | 3/1985 | Barnett et al. | |
| 4,659,625 A | 4/1987 | Decroly et al. | |
| 4,677,017 A | 6/1987 | DeAntonis et al. | |
| 4,910,258 A | 3/1990 | Inoue et al. | |
| 5,139,878 A | 8/1992 | Kim et al. | |
| 5,196,614 A | 3/1993 | Caporiccio et al. | |
| 5,453,477 A | 9/1995 | Oxenrider et al. | |
| 5,547,761 A | 8/1996 | Chapman, Jr. et al. | |
| 5,833,070 A | 11/1998 | Mizuno et al. | |
| 5,855,977 A | 1/1999 | Fukushi et al. | |
| 6,025,436 A | 2/2000 | Kawashima et al. | |
| 6,096,428 A | 8/2000 | Jing et al. | |
| 6,138,830 A | 10/2000 | Muggli | |
| 6,197,393 B1 | 3/2001 | Jing et al. | |
| 6,365,684 B1 | 4/2002 | McCarthy et al. | |
| 6,878,772 B2 | 4/2005 | Visca et al. | |
| 7,615,600 B2 | 11/2009 | Capron et al. | |
| 7,868,087 B2 | 1/2011 | Mayes et al. | |
| 2002/0028884 A1 | 3/2002 | Formaro et al. | |
| 2007/0128393 A1 | 6/2007 | Rianal et al. | |
| 2007/0244262 A1 | 10/2007 | Zhang | |
| 2008/0171844 A1 | 7/2008 | Samuels et al. | |
| 2009/0288728 A1 | 11/2009 | Sumi et al. | |
| 2010/0330317 A1 | 12/2010 | Ameduri et al. | |
| 2011/0168630 A1 | 7/2011 | Mayes et al. | |

FOREIGN PATENT DOCUMENTS

| | | |
|---|---|---|
| CN | 1469892 A1 | 1/2004 |
| CN | 101610973 A | 12/2009 |
| GB | 2161816 A | 1/1986 |
| GB | 2180554 | 4/1987 |
| JP | 5930847 | 2/1984 |
| JP | 2009227780 A | 10/2009 |

OTHER PUBLICATIONS

Kim, Y.W., et al., "Single-Step synthesis of proton conducting poly(vinylidene fluoride) (PVDF) graft copolymer electrolytes", European Polymer Journal, Dec. 31, 2007, vol. 44 Issue 3, pp. 932-939, 938.

Katsuhara, et al. "Fluorine chemistry at Central Glass", Journal of Fluorine Chemistry, Dec. 1, 2005, vol. 127 Issue 1, pp. 8-17.

Taguet, et al. "Crosslinking of Vinylidene Fluoride-Containing Fluoropolymers" Adv. Polym. Sci, 184 (2005) 187-211.

Kostov, G., "Novel Fluoroacrylated Copolymers: Synthesis, Characterization and Properties" Journal of Fluorine Chemistry 2005, 126, 231-240.

Montefusco F., "Original Vinylidene Fluoride-Containing Acrylic Monomers as Surface Modifiers in Photopolymerized Coatings", Macromolecules 2004, 37, 9804-813.

Ameduri B., et al., "New Fluorinated Acrylic Monomers for the Surface Modification of UV-Curable Systems", Polym Sci A: Polym Chem 1999, 37, 77-87.

Ameduri B., et al,"Effect of the Structural Parameters of a Series of Fluoromonoacrylates on the Surface Properties of Cured Films", J Polym Sci Part A: Polum Chem 2001, 39, 4227.

Guit, J. et al., "Synthesis and copolymerization of Flurionated Monomers Bearing a Reactive Lateral Group. XX. Copolymerization of Vynilidene Fluoride with 4-Bromo-1,1,2-trifluorobut-1-ene", Journal of Polymer Science Part A: Polymer Chemistry, Mar. 1, 2005, vol. 43, Issue 5 pp. 917-935.

(Continued)

*Primary Examiner* — Irina S Zemel
*Assistant Examiner* — Jeffrey Lenihan
(74) *Attorney, Agent, or Firm* — Ingrassia Fisher & Lorenz PC

(57) ABSTRACT

Fluorinated macromonomers, a PCTFE-g-poly(M) graft copolymer, and moisture barrier films and articles formed therefrom are provided. The PCTFE-g-poly(M) graft copolymers have a PCTFE backbone component and a plurality of pendant groups attached to the PCTFE backbone component.

20 Claims, 7 Drawing Sheets

(56) References Cited

OTHER PUBLICATIONS

Katoh, E., et al. "Molecular Motion and Properties of Flexible Fluoropolymers by H Pulse NMR"; Polymer Journal 1995, 27, 645-50.

Tsang, E. M. W.; "Considerations of Macromolecular Structure int he Design of Proton Conducting Polymer MembranesL Graft versus Diblock Polyelectrolytes"; Journal American Chemical Society 2007, 129, 15106-7.

Tsang, E. M. W.; "Nanostructure, Morphology, and Properties of Fluorous Copolymers Bearing Ionic Grafts" Macromolecules 2009, 42, 9467-80.

Chung, T. et. el., "New Proton Conductive Composite Materials with Inorganic and Styrene Grafted and Sulfonated VDF/CTFE Fluoropolymers" Prepr. Symp.—Am. Chem. Soc., Div. Fuel Chem. 2008, 53, 783-784.

Kim, Y., et al. "Proton Conducting poly(vinylidene fluoride-co-chlorotrifluorethylene) Graft Copolymer Electrolyte Membranes", Journal Membraine Science. 2008, 313, 315-22.

Koh, J. H.; "Templated Synthesis of Silver Nanoparticles in Amphiphilic Poly(vinylidene fluoride-co-chlorotrifluoroethylene) Comb Copolymer" J. H. J. Polymer Science, Part B: Polymer. Phys. 2008, 46, 702-9.

Koh, J. H.; "Nanofiltration Membranes Based on Poly(vinylidene Fluoride-co-cholortrifluoroethylene)-graft-poly(styrene sulfonic acid)" Polymers for Advanced Technology, 2008, 19, 1643-48.

Li, HF; "Preparation and Microstructure of Poly(vinylidenefluoride-co-chlorotrifluoroethylene)" Journal of Central South University (Science and Technology), v40, n2, 362-6 Apr. 2009.

Koh, J. K; "Synthesis and Characterization of AgBr Nanocomposites by Templated Amphiphilic Comb Polymer" Journal of Colloid Interface Science. 2009, 338, 486-490.

Koh, J. K.; "Templated Synthesis of Ag Loaded TiO2 Nanostructures Using Amphiphilic Polyelectrolyte" Materials Letters, 2009, 63, 1360-1362.

Patel, R.; "Composite Polymer Electrolyte Membranes Comprising P(VDF-co-CTFE)-g-PSSA Graft Copolyer and Zeolite for Fuel Cell Applications" Polymers for Advanced Technologies 2009, 20, 1146-51.

Koh, J. K., "Antifouling Poly(vinylidene Fluoride) Ultrafiltration Membranes Containing Amphiphilic Comb Polymer Additive" Journal of Polymer Science, Part B: Polymer Physics 2010, 48, 183-89.

Li, H.-f.; "Synthesis and Characterization of a Novel Graft Copolymer Poly(vinylidene fluoride-co-chlorotrifluoroethylene)-g-poly(6-((4-cyano-4-biphenyl)oxy) hexyl methacrylate)"; Journal of Central South University (Science and Technology) Zhongnan Daxue Xuebao, Ziran Kexueban 2010, 41, 1724-1729.

Roh, D. K.;"Nanocomposite Proton Conducting Membranes Based on Amphiphilic PVDF Graft Copolymer" Macromolecular Research 2010, 18, 271-278.

Tan, S.; P(VDF-co-TrFE-co-CTFFE)-g-SPS; Acta Polymerica Sinica, Nov. 2010, 11, 1269-75.

Koh, J. H.;"Templated Synthesis of Porous TiO2 Thin Films Using Amphiphilic Graft Copolymer and Their Use in Dye-Sensitized Solar Cells", Thin Solid Films 2011, 519, 158-63.

Liu, F.; "Hydrophilic Modification of P(VDF-co-CTFE) Porous Membrances" Chemical Engineering Science, 2011, 66, 27-35.

Park, J. T.; "Proton-conducting Nanocomposite Membranes Based on P9VDF-co-CTFE)-g-PSSA Grat Copolymer and TiO2-PSSA Nanoparticles" Hydrogen Energy 2011, 36, 1820-1827.

Seo, Jin, et al.,"Quasi Solid-State Dye-Sensitized Solar Cells Based on P9VDF-co-CTFE) Graft Copolymer Electrolytes" Current Applied Physics, 2010 S414-S417.

Souzy, R., et al., "Synthesis of Funcitonal Polymers—Vinylidene Fluoride Based Fluorinated Copolymers and Terpolymers Bearing Bromoaromatic Side-Group", Wiley InterScience, May 26, 2004.

Zhang, Mingfu, et al., "Graft Copolymers from Poly(vinylidene fluordie-co-cholorotrifluoroethylene) via Atom Transfer Radical Polymerization", Macromolecules, 2006, 39, 3531-3539.

Zulfiqar, S., "Study of the Thermal Degradation of Polychlorotrifluoroethylene, Poly(vinylidenefluoride) and Copolymers of Chlorotrifluoroethylene and Vinylidene Fluoride", Polymer Degradation and Stability, 1994, 423-430.

Ding, G, et al., "Study on Chain Structure of Vinylienefluoride (VDF)/cholorotrifluoroethylene (CTFE) Copolymer", Chinese Journal of Explosives and Propellants, v 24, nf, p. 31-33, 2001.

Guiot, J., "Synthesis and Copolymerization of Fluorinated Monomers Bearing a Reactive Lateral Group XX Copolymerization of Vinylidene Fluoride with 4-Bromo-1,1,2-trifluorobut-1-ene", Journal of Polymer Science, Part A: Polymer Chemistry, v43, n5, p. 917-935, Mar. 1, 2005.

Yadav, et al. "Thermoreversible Gelatin of Poly(vinylidene fluoride-co-chlorotrifluoro-ethylene): Structure, Morphology, Thermodynamics and Theoretical Prediction", Macromolecules, 2011, 44, 3029-3038.

Hui-Min, et al., "PVDF-based Copolymers & Terpolymers from P(VDF-CTFE) 9 1/9 mol%", 13th International Symposium on Electrets, ISE, 13, 1 pp. 15-17, Sep. 2008.

CN Office Action for Application No. CN 201280069663.8 dated Sep. 18, 2015.

\* cited by examiner

PROCESS, PROPERTIES, AND APPLICATIONS OF GRAFT COPOLYMERS

CROSS-REFERENCE TO RELATED APPLICATIONS

The present disclosure claims the benefit of priority to U.S. Provisional Patent Application Ser. No. 61/570,572, filed on Dec. 14, 2011, the contents of which are herein incorporated by reference in their entirety.

BACKGROUND OF THE INVENTION

1. Field of the Invention

The invention is related to the field of graft copolymers. Provided are macromonomers, graft copolymers made from macromonomers, moisture barrier films, and articles formed therefrom. Also provided are processes for the synthesis of graft copolymers, and monomers used in said processes.

2. Description of the Related Art

A wide variety of thermoplastic polymers and films formed from such thermoplastic polymers are known. Important physical characteristics of such films include barrier properties, such as barriers to gas, aroma, and moisture, toughness, such as wear and weathering resistances, and light-transmittance. These properties are especially important in film applications, including use as packaging material for food or medical products.

Demand for flexible packaging materials with high moisture and oxygen barrier properties is constantly growing due to the advent of new drugs and drug-coated diagnostic devices. Conventionally, it has been desirable to use or incorporate fluoropolymer films in packaging applications, as they are known for their barrier properties, inertness to most chemicals, resistance to high temperatures, and low coefficients of friction. See, for example, U.S. Pat. Nos. 4,146,521; 4,659,625; 4,677,017; 5,139,878; 5,855,977; 6,096,428; 6,138,830; and 6,197,393, which teach multilayer fluoropolymer-containing films. Films including polychlorotrifluoroethylene ("PCTFE") homopolymer or copolymers are particularly advantageous due to their excellent moisture barrier properties. Such films also exhibit high thermal stability, excellent toughness, and clarity at room temperature.

As fluoropolymer performance demands have increased, there has been a particular focus in the art on the relationship between fluoropolymer architecture and fluoropolymer properties. The study of structured fluoropolymers, such as fluorotelomers, fluorotelechelics, alternated copolymers, block copolymers, gradient copolymers, graft copolymers, and dendrimers has found that fluoropolymer properties may be directly affected by polymer architecture. With particular regard to graft polymerization, it is known that the properties of a fluoropolymer may be modified by grafting co-monomer pendant chains onto the fluoropolymer backbone. Depending on the nature of the co-monomers, these graft copolymers often retain the desirable properties of the parent fluoropolymer "backbone" while adding the desirable properties of the co-monomer pendent chains. See, for example, U.S. Pat. No. 4,308,359, which teaches polyvinylidenefluoride (PVDF) graft copolymers formed with ethylenically unsaturated co-monomers, such as a vinyl monomer, acrylonitrile, styrene, or an olefin. These graft copolymers have certain physical characteristics, such as better solvent resistance, workability, and adhesiveness than were previously known. U.S. Pat. No. 4,910,258 teaches fluorine-containing graft copolymers having a fluorine-containing elastomer copolymer backbone, for example a copolymer of vinylidene fluoride, chlorotrifluoroethylene (CTFE) and t-butyl peroxyallylcarbonate, and fluorine-containing crystalline polymer branches, for example copolymers of CTFE and ethylene. These graft copolymers are useful as a fluororesin intermediate between fluororubbers and crystalline fluororesins.

U.S. patent application publication 2007/0244262 teaches graft copolymers having a crystalline backbone such as poly (vinylidene fluoride-co-chlorotrifluoroethylene), poly(ethylene-co-chlorotrifluoroethylene), copolymers of chlorotrifluoroethylene with alkyl vinyl ether or alkyl vinyl ester, and poly(chlorotrifluoroethylene-co-vinylidene fluoride-co-tetrafluoroethylene), having amorphous side chains grafted thereto, such as polystyrene, poly(acrylic acid), or poly(tert-butyl acrylate). U.S. patent application publication 2007/0244262 specifically teaches away from graft copolymers having a PCTFE backbone due to the insolubility of PCTFE in the solvents required by their polymerization process.

As demand has grown, it has been met mainly by enhancing existing products. For example, PCTFE films are now available up to 150 µm thick, more than doubling their barrier properties relative to traditional 50 µm structures. However, while these thicker materials may meet the desired barrier properties, they are not cost effective and their use is restricted to specialty packaging applications. Such thicker films are also difficult to process as packaging films. One suitable way to reduce the cost of a packaging material fabricated from a costly polymer is to form multilayer structures in which the polymer film is laminated with other, less costly polymer films. However, fluoropolymers do not adhere strongly to most other polymers. In fact, most fluoropolymers are known for their non-stick characteristics. This is very disadvantageous, because poor bond strength between layers can result in the delamination of multilayer films. As a result, specialized intermediate adhesive layers that increase the cost of the packing structure are generally needed to attach most other polymer films to fluoropolymer films.

As such, there remains a need in the art for cost effective packaging films having improved moisture and oxygen barrier properties that meet present and future performance demands.

SUMMARY OF THE INVENTION

Fluorinated macromonomers, PCTFE-g-poly(M) graft copolymers and moisture barrier films and articles formed therefrom are provided. In one embodiment, the PCTFE-g-poly(M) graft copolymers have an oligo- or poly-CTFE backbone component and a plurality of pendant groups attached to the oligo- or poly-CTFE backbone component.

Further disclosed, in another embodiment, is a process for the synthesis of PCTFE-g-poly(M) graft copolymers, the process comprising:

a) providing a macromonomer having the formula $X-[C(A)_2C(B)(B')]_n-Q[CY=C(Z)(Z')]$ or $[C(A)_2=C(B)]_n-Q[C(Y)(Y')-C(Z)(Z')]-X'$, wherein A is either H or F; B and B' are either H, F, or Cl, and are not necessarily the same; X and X' are Br, Cl or I (and are not necessarily the same); Y and Y' are F, Br, Cl or I (and are not necessarily the same); and wherein Z and Z' are F, Br, Cl or I (and are not necessarily the same); Q is optional and is either oxygen (O) or sulfur (S); and n is at least 1; and b) reacting the $X-[C(A)_2C(B)(B')]_n-Q[CY=C(Z)(Z')]$ or $[C(A)_2=C(B)]_n-Q[C(Y)(Y')-C(Z)(Z')]-X'$ molecule with a CTFE monomer in the presence of a free radical initiator, thereby forming the CTFE monomer into a poly-CTFE graft copolymer backbone component having one or more $X'—[C(A)_2C(B)(B')]_n—$ or $—[C(Y)(Y')—C(Z)(Z')]—X'$ pendant monomer components attached thereto.

Still further, in another embodiment, disclosed is a process for the a $X'—[C(A)_2C(B)(B')]_n—CY=C(Z)(Z')$ molecule, wherein A is either H or F; B and B' are either H, F, or Cl, and are not necessarily the same; X and X' are Br, Cl or I (and are not necessarily the same); Y is F, Br, Cl or I; and wherein Z and Z' are F, Br, Cl or I (and are not necessarily the same); and n is at least 1, the process comprising:

a) reacting a $C(A)_2C(B)(B')$ taxogen and an $X—C(Y)(Y')=C(Z)(Z')—X'$ telogen in the presence of a free radical initiator, wherein Y' is F, Br, Cl or I, thereby forming a dihalogenated telomer having the formula:

$$X'—[C(A)_2C(B)(B')]_n—C(Y)(Y')=C(Z)(Z')—W$$

and b) dehalogenating said dihalogenated telomer to form a monomer, $X'X'—[C(A)_2C(B)(B')]_n—CY=C(Z)(Z')$.

DETAILED DESCRIPTION OF THE INVENTION

Figure 1:
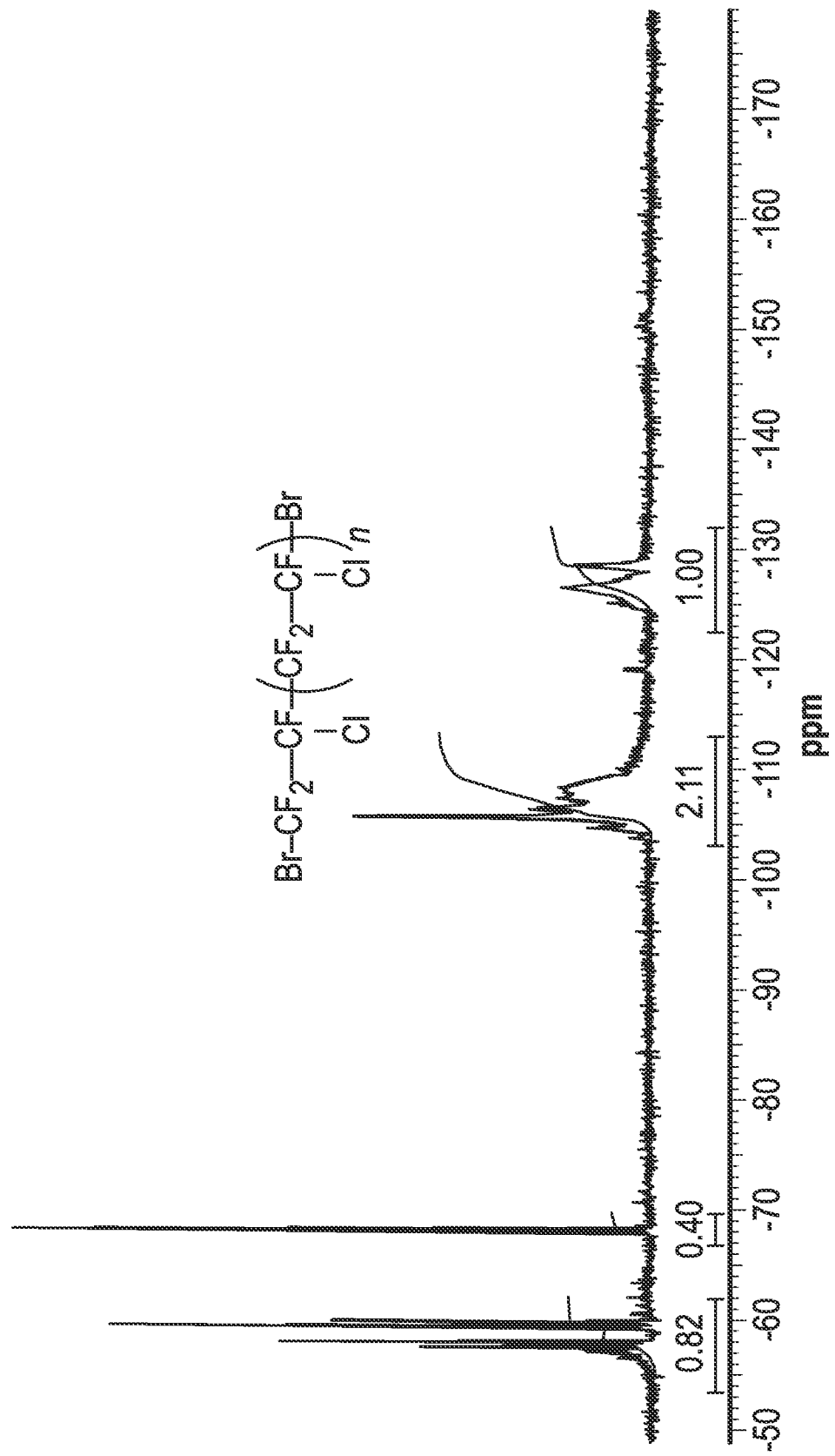
FIG. 1 illustrates the $^{19}F$ NMR spectrum of $Br—CF_2—CFCl—(CF_2—CFCl)_n—Br$, where n is greater than 5, recorded in $CDCl_3$.

It has now been discovered that branched, graft copolymers derived from chlorotrifluoroethylene may be produced to enhance the moisture barrier properties of thin PCTFE-based films, fulfilling the aforementioned need in the art. Through the discovery of a new monomer starting material, a process has been developed which allows the synthesis of unique graft copolymers having a PCTFE backbone and 2-carbon monomer/macromonomer (also referred to alternatively as "macromer") pendent groups. Monolayer films formed from these graft copolymers should exhibit improved moisture barrier properties relative to standard PCTFE or PCTFE-based monolayer films of identical thickness.

In accordance with exemplary embodiments of the present disclosure, PCTFE-based graft copolymers, also identified as poly(CTFE)-based graft copolymers (PCTFE-g-poly(M) graft copolymer), are branched copolymers derived from CTFE and a monomer/macromonomer molecule having "n" repeating taxogen units. When n is equal to 1, it is referred to as $C_4$ monomer and when n is greater than 1, the resulting molecules are referred to as "macromonomers" due to their significant molecular weight relative to other fluoromonomers. As used herein, a "telomer" is defined as a molecule having a small chain length, typically about 2 to about 20 units. Due to its small size, a telomer is capable of functioning as a monomer precursor, i.e. the monomer derived from the telomer (by dehalogenation) and is capable of binding chemically to other monomers to form a polymer, particularly when in the presence of a free radical initiator. A telomer is a reaction product of a "taxogen" and a "telogen," and the process of forming a telomer is referred to herein as "telomerization." A "taxogen" is defined herein as a molecule which supplies the links of the telomer chain. A "telogen" is defined herein as a molecule which supplies the end groups or terminal groups of the telomer chain.

The telomer is synthesized by a reaction of a $C_2$ taxogen of the formula $C(A)_2=C(B)(B')$, wherein A is either H or F; and B and B' are either H, F, or Cl, and are not necessarily the same, with a halogenated $C_2$ telogen of the formula $X—C(Y)(Y')C(Z)(Z')—X'$, in the presence of one or more reagents, where X and X' are Br, Cl or I (and are not necessarily the same); Y and Y' are F, Br, Cl or I (and are not necessarily the same); and wherein Z and Z' are F, Br, Cl or I (and are not necessarily the same); thereby forming a $C_{2+2(n)}$ dihalogenated telomer of the formula:

$$X—[C(A)_2C(B)(B)]_n—[C(Y)(Y')C(Z)(Z')]—X'$$

wherein n is at least 1, preferably from 1 to about 20, more preferably from 1 to about 15, even more preferably from 1 to about 10, and most preferably from 1 to about 5. Where X and X' are not the same, the dihalogenated telomer is considered inter-halogenated. In some examples, especially where n is greater than 1, the telomer is synthesized by radical telomerization of the taxogen with the $C_2$ telogen, in the presence of one or more free radical initiators as the aforementioned reagents.

Examples of the $C_2$ taxogen $C(A)_2=C(B)(B')$ include, but are not limited to, $CH_2=CH_2$ (ethylene), $CH_2=CF_2$ (vinylidene fluoride, "VDF"), $CH_2=CCl_2$, (vinylidene chloride, "VDC"), and $CF_2=CFCl$ (CTFE). Where the $C_2$ taxogen is ethylene, n is preferably equal to 1.

The $C_2$ telogen reactant $X—C(Y)(Y')C(Z)(Z')—X'$ may be synthesized or commercially procured. In one example, the $C_2$ telogen reactant includes $BrCF_2CFClBr$ (dibrominated CTFE), $CF_2ClCFClI$, or $CF_2BrCFClI$. Dibrominated CTFE, $CF_2ClCFClI$, and $CF_2BrCFClI$ are known in the art. For example, CTFE may be reacted with bromine ($Br_2$) or ICl or IBr to produce $Br(CTFE)Br$, $CF_2ClCFClI$ or $CF_2BrCFClI$ as follows:

$$Br_2+F_2C=CFCl \rightarrow BrCF_2CFClBr$$

$$ICl+F_2C=CFCl \rightarrow ClCF_2CFClI$$

$$IBr+F_2C=CFCl \rightarrow BrCF_2CFClI$$

The $X—C(Y)(Y')C(Z)(Z')—X'$ telogen may also be synthesized, for example, by reacting $F_2C=CFBr$ with $Br_2$, ICl or IBr to produce $BrCF_2CFBr_2$, $ClCF_2CFBrI$ and $BrCF_2CFBrI$, respectively. Alternately, the $C_2$ telogen may be synthesized, for example, by reacting $F_2C=CFH$ with $Br_2$, ICl or IBr produce $BrCF_2CFHBr$, $ClCF_2CFHI$ and $BrCF_2CFHI$. The telogens may be referred to as "dihalogenated" telogens, with reference to the X, X' molecules thereof. As defined herein, the term "dihalogenated" includes molecules where the telogen is inter-halogenated, i.e. where the halogen end groups are not the same, e.g. Br and I, Br and Cl, or Cl, and I.

In a typical process, this reaction is conducted by bubbling a halogenated ethylene of the formula $C(Y)(Y')=C(Z)(Z')$, including but not limited to CTFE, into a solution of halogen, including but not limited to bromine, cooled with an ice-bath. Decoloration of the bromine solution indicates the end of the reaction. Distillation of the reaction mixture at about 99° C.-100° C. under atmospheric pressure gives the dibrominated telogen, $BrCF_2CFClBr$ or $BrCF_2CF_2Br$, as a liquid in almost quantitative yield.

As noted above, the telomer is synthesized via a reaction of the taxogen with the telogen, which in many embodiments can include free radial telomerization. Telomerization of the monomers is conducted in the presence of a free radical initiator and may be conducted in bulk without a solvent or in solution, emulsion (including a mini- or micro-emulsion), or suspension (including a mini- or micro-suspension), each with a solvent. In this regard, reference is made to B. Améduri et al.,"Well-Architectured Fluoropolymers; Synthesis, Properties & Applications", Elsevier, 2004 (ch. 1), for further information regarding such telomerization. Preferably, the process is conducted in solution, emulsion, or suspension with a solvent. Solution telomerization is preferred because the required operating pressures are relatively low.

In a preferred process, the reactor vessel is first charged with the dihalogenated X—C(Y)(Y')C(Z)(Z')—X' telogen; a solvent; and a suitable reagent, which in many examples is a free radical initiator, after which the $C_2$ taxogen $C(A)_2$=C(B)(B') is added. Preferably, the solvent is pre-charged into the reactor vessel. Any commercially available reagent, such as a free radical initiator, may be used for the radical telomerization of the telomer/monomer/macromonomer. Suitable reagents and radical initiators include oxidation-reduction ("redox") initiator systems. Useful redox initiator systems include both an oxidizing agent and a reducing agent. Suitable oxidizing agents include peroxides such as hydrogen peroxide, potassium peroxide, ammonium peroxide, tertiary butyl hydroperoxide (TBHP) (($CH_3)_3$ COOH), dicumyl hydroperoxide, diacyl peroxides, dialkyl peroxides, alkyl peroxypivalates including t-alkyl peroxypivalates, alkyl peroxydicarbonates including dialkyl peroxydicarbonates, ketone peroxides, and t-amyl hydroperoxide. Also useful are metal persulfates, such as potassium, sodium persulfate, and ammonium persulfate. Useful oxidizing agents also include manganese triacetate, potassium permanganate, ascorbic acid, and mixtures thereof. Suitable reducing agents include sodium sulfites such as sodium bisulfite, sodium sulfite, sodium pyrosulfite, sodium-m-bisulfite (MBS) ($Na_2S_2O_5$), and sodium thiosulfate, as well as other sulfites such as ammonium bisulfite, hydroxylamine, hydrazine, ferrous ions, organic acids such as oxalic acid, malonic acid, citric acid, and combinations of the above.

Generally, any redox initiator system known to be useful in the preparation of fluoropolymers such as PCTFE may be used for the synthesis of the telomer. Representative examples of redox initiator systems inclusive of both an oxidizing agent and a reducing agent are azo compounds, such as azobisisobutyronitrile, dialkyl peroxydicarbonates, acetylcyclohexanesulfonyl peroxide, aryl or alkyl peroxides including dibenzoyl peroxide, dicumyl peroxide and t-butyl peroxide, alkyl hydroperoxides, alkyl perbenzoates including t-alkyl perbenzoates, and redox initiator systems incorporating alkyl peroxypivalates including t-alkyl peroxypivalates. Preferred redox initiators are those which incorporate dialkyl peroxydicarbonates, such as diethyl and di-isopropyl peroxydicarbonates, alkyl peroxypivalates such as t-butyl peroxypivalate and t-amyl peroxypivalate. More preferred are dialkyl peroxides, particularly t-butyl peroxide, dialkyl peroxydicarbonates, particularly diethyl and diisopropyl peroxydicarbonates, and t-alkyl peroxypivalates, particularly t-butyl and t-amyl peroxypivalates. The most preferred reagents are the free radical initiators 2,5-dimethyl-2,5-di(tert-butylperoxy)hexane, an example of which is TRIGONOX® 101, commercially available from AkzoNobel Polymer Chemicals LLC of Chicago, Ill., and tert-butyl peroxypivalate.

Preferably, the initial molar ratio of the $C_2$ taxogen monomer to the $C_2$ telogen in the reaction vessel is at a molar ratio of from about 10:1 to about 1:20, more preferably from about 5:1 to about 1:10, and most preferably from about 3:1 to about 1:5.

Preferably, the initial molar ratio between the reagent, such as the free radical initiator, and the combined $C_2$ taxogen and $C_2$ telogen monomers in the reaction vessel is at a monomer (combined):initiator molar ratio of from about 10:1 to about 10,000:1, more preferably from about 50:1 to about 1,000:1, and most preferably from about 100:1 to about 500:1. The reagent, such as the radical initiator, is generally added incrementally over the course of the reaction, starting off with a rapid, initial charge of initiator provided to affect the onset of telomerization. In the initial charge, generally from about 10 ppm/min to about 1,000 ppm/min is added over a period of from about 3 minutes to about 30 minutes. This is followed by slow, incremental, continuous charging of initiator over a period of from about 1 hour to about 6 hours or until telomerization has concluded. In the continuous charge, generally from about 0.1 ppm/min to about 30 ppm/min of initiator is added. The molar ratio of total monomer consumed (taxogen plus telogen) to reagent, such as radical initiator, will depend upon the molecular weight desired.

Solvents useful for the synthesis, including the free radical telomerization, of the telomer include any solvent capable of dissolving the $C_2$ taxogen and telogen reactants. Suitable solvents non-exclusively include conventional organic solvents such as esters of formula R—COOR' where R and R' are independently $C_{1-5}$ alkyl groups, or ester OR" where R" is an alkyl containing 1 to 5 carbon atoms, and where R may also be hydrogen. Of these organic solvents, it is preferred that R=H or $CH_3$ and R'=$CH_3$, $C_2H_5$, i-$C_3H_7$ or t-$C_4H_9$. Also useful are fluorinated solvents which non-exclusively include $ClCF_2CFCl_2$ (TCTFE, known as CFC-113), $C_6F_{14}$, n-$C_4F_{10}$, and 1,1,1,3,3-pentafluorobutane. Particularly preferred fluorinated solvents include the family of fluorinated solvents commercially available from 3M Company of St. Paul, Minn. under its FLUORINERT® trademark, such as perfluoro-2-n-butyl-tetrahydrofuran (available from 3M Company under its designation FC 75), alone or in combination with 1,1,2-trichloro-trifluoroethane (TCTFE) as a co-solvent. Other useful solvents non-exclusively include conventional solvents such as 1,2-dichloroethane, isopropanol, tertiary butanol, acetonitrile and butyronitrile. The preferred solvents are methyl acetate, acetonitrile, perfluoro-n-hexane, perfluoro-2-n-butyl-tetrahydrofuran, 1,1,1,3,3-pentafluorobutane, and a mixture of 1,1-dichloro-2,2,3,3-pentafluoropropane and 1,3-dichloro-1,1,2,2,3-pentafluoropropane. The quantity of solvent used in the reaction would be determinable by one skilled in the art. Preferably, the solvent is used in an amount of from about 30% to about 60% by weight based on the combined weight of the taxogen and telogen reactants, the reagent, and the solvent.

To increase the solubility of the fluorinated co-monomers, a co-solvent may also be used in combination with the solvent. Useful co-solvents non-exclusively include acetonitrile, acetone, alkyl ketones such as methyl ethyl ketone, and water. For example, in an emulsion or suspension telomerization process, water is generally used as a reaction medium, typically deionized, nitrogen-purged water. In this regard, a solvent as identified above may be present in water as a co-solvent. When a co-solvent is present, the solvent preferably comprises from about 30% to about 70% by weight of the combined solvent and co-solvent. However, it should be noted that fluorinated monomers are only partially soluble in water, so when water is present as a co-solvent, a surfactant is typically needed, e.g. as an emulsifier. In this regard, useful surfactants include anionic, cationic and non-ionic surfactants. When present, the surfactant preferably comprises from greater than about 0% to about 10% by weight of the solvent system, i.e. the weight of the solvent alone or of a combination of a solvent and a co-solvent, more preferably from greater than about 0% to about 5% by weight, and most preferably from about 1% to about 3% by weight of the solvent system. Preferred surfactants are anionic surfactants, particularly perfluorinated anionic surfactants. Examples of suitable perfluorinated anionic surfactants include perfluorinated ammonium octanoate, perfluorinated alkyl/aryl ammonium (metal) carboxylates and perfluorinated alkyl/aryl lithium (metal) sulfonates wherein the alkyl group has from about 1 to about 20 carbon atoms, and amphiphilic copolymers based on poly(ethylene oxide). Suitable surfactants also include fluorinated ionic or nonionic surfactants, hydrocarbon-based surfactants such as the alkylbenzenesulfonates or mixtures of any of the foregoing.

The reaction temperature for the synthesis of the telomer is preferably from about 20° C. to about 250° C., more preferably from about 55° C. to about 140° C. During the reaction, the reaction vessel, e.g. an autoclave, is preferably maintained at an interior pressure of from about 1.5 bars (0.150 MPa) to about 100 bars (10 MPa), more preferably from about 3.5 bars (0.35 MPa) to about 55 bars (5.5 MPa), still more preferably from about 10 bars (1.0 MPa) to about 42 bars (4.2 MPa), and most preferably from about 20 bars (2.0 MPa) to about 35 bars (3.5 MPa). While preferred, these temperature and pressure ranges are not intended to be strictly limiting. The reaction, such as telomerization, is preferably conducted under agitation to ensure proper mixing, with the agitation rate being determined by one skilled in the art, typically being from about 5 rpm to about 800 rpm depending on the geometry of the agitator and the size of the vessel.

The reaction product of this synthesis is a dihalogenated telomer having the formula:

$$X—[C(A)_2C(B)(B')]_n—[C(Y)(Y')C(Z)(Z')]—X'$$

wherein A is either H or F; B and B' are either H, F, or Cl, and are not necessarily the same; X and X' are Br, Cl or I (and are not necessarily the same); Y and Y' are F, Br, Cl or I (and are not necessarily the same); and wherein Z and Z' are F, Br, Cl or I (and are not necessarily the same). Free radical telomerization can be employed particularly where n is desired to be greater than 1, although it may also be employed where n is equal to 1.

In a preferred embodiment, the telomer/monomer/macromonomer is synthesized via radical telomerization of a CTFE taxogen with a dibrominated CTFE telogen where X is bromine and the dihalogenated CTFE telogen is BrCF$_2$CFClBr. In this preferred embodiment, a CTFE taxogen is reacted with the BrCF$_2$CFClBr telogen in the presence of a free radical initiator to thereby form a dihalogenated telomer having the formula:

$$Br—[—CTFE-]_n-(CTFE)-Br$$

wherein n is at least 1, preferably from 3 to 20, more preferably from 3 to 15, even more preferably from 3 to 10, and most preferably from 3 to 5.

In another preferred embodiment, the telomer/monomer/macromonomer is synthesized via radical telomerization of a VDF taxogen with a dibrominated CTFE telogen where X is bromine and the dihalogenated CTFE telogen is BrCF$_2$CFClBr. In this preferred embodiment, a VDF taxogen is reacted with the BrCF$_2$CFClBr telogen in the presence of a free radical initiator to thereby form a dihalogenated telomer having the formula:

$$Br—[—VDF—]_n—(CTFE)-Br$$

wherein n is at least 1, preferably from 3 to 20, more preferably from 3 to 15, even more preferably from 3 to 10, and most preferably from 3 to 5.

In yet another preferred embodiment, the telomer/monomer/macromonomer is synthesized using an ethylene taxogen with a dibrominated CTFE telogen where X is bromine and the dihalogenated CTFE telogen is BrCF$_2$CFClBr. In this preferred embodiment, an ethylene taxogen is reacted with the BrCF$_2$CF$_2$Br telogen in the presence of a Bz$_2$O$_2$ (benzoyl peroxide) reagent to thereby form a dihalogenated telomer having the formula:

$$Br-[-Ethylene-]_1-(CTFE)-Br$$

It is noted that a free radical telomerization is not employed as the synthesis means for this reaction, as n is equal to 1, but rather Bz$_2$O$_2$ is preferably employed as the reagent.

The dihalogenated telomer may be recovered from the reaction vessel using conventional techniques in the art, such as by distillation. Other useful methods include evaporating or freeze-drying the solvents, precipitating the solids from the solvent/reaction product mixture with an agglomerating or coagulating agent such as ammonium carbonate, followed by filtration or centrifuging, or liquid-liquid extraction.

Next, the telomer is dehalogenated to remove one of the halogen groups, forming a monohalogenated telomer. It should also be understood that the terms "dihalogenated," "monohalogenated," and "dehalogenated" in this context refer only to the telomer end groups and not the halogen (such as chlorine or fluorine) atoms of, for example, CTFE the molecule. Either halogen group X or X' may be removed. Typically, where the X' halogen group is removed, along with the Y' molecule in the telogen, resulting in a —CY═C(Z)(Z'), such as CF$_2$═CF— end group in the example of CTFE telogen. Alternatively, where the X halogen group is removed, along with the B' molecule in the taxogen, the resulting structure is a C(A)$_2$═C(B)— end group. Where B' is H, the reaction is a dehydrohalogenation reaction. Further, where X is Br, the reaction is a dehydrobromination reaction. The dehalogenation reaction may be conducted using conventional means in the art. Typically, such dehalogenation reactions are conducted with zinc, magnesium, tin, sodium or potassium in the presence of a solvent, such as acetic acid, tetrahydrofuran (THF), dimethoxyethane (glyme), ethylene glycol, dimethylformamide (DMF), an alcohol, such as methanol or ethanol, or potassium hydroxide in an alcohol solution, at a temperature of from about 0° C. up to about 150° C. In a preferred embodiment, the dehalogenation reaction is conducted with zinc powder and a THF solvent at or below room temperature, typically from about 0° C. up to about 20° C.-40° C. In another preferred embodiment, the dehalogenation reaction is conducted with KOH in and ethanol solution.

The above process results in the synthesis of a monohalogenated telomer molecule (monohalogenated monomer molecule) having the formula:

$X—[C(A)_2C(B)(B')]_n—CY=C(Z)(Z')$, such as:

$X—[C(A)_2C(B)(B')]_n—CF=CF_2$ where CTFE is used as telogen;

or, $[C(A)_2=C(B)]_n—[C(Y)(Y')—C(Z)(Z')]X'$, such as:

$[C(A)_2=C(B)]_n—(CTFE)-W$ where CTFE is used as telogen

As stated above, n is preferably from 1 to 20, more preferably from 1 to 15, even more preferably from 1 to 10, and is most preferably from 1 to 5. Most preferably, X and/or X' is Br. The value of n is controlled by the initial molar ratio of the taxogen and telogen, and whether free radical telomerization is employed as the synthesis means. However, the higher the n value, the more difficult it becomes to copolymerize the macromonomer, because the monomer viscosity increases as n increases, so the lower n value ranges are most preferred in this instance. Greater n values may be desired for other telomer end uses.

In a preferred embodiment, a monohalogenated telomer of the formula $X—[C(A)_2C(B)(B')]_n—CF=CF_2$ includes $Br—(CTFE)_n-CF=CF_2$ or $Br—(VDF)_n—CF=CF_2$, wherein the preferred CTFE or VDF taxogen, respectively, are used as described above. In another preferred embodiment, a monohalogenated telomere of the formula $[C(A)_2=C(B)]_n—(CTFE)-W$ includes $CH_2=CH—(CTFE)-Br$ (n being equal to 1, wherein this telomere is the compound 4-bromo-3-chloro-3,4,4-trifluoro-1-butene ("BCTFB").

As also stated above, the macromonomer may also optionally incorporate sulfur or oxygen groups, wherein the macromonomer has the formula $X—[C(A)_2C(B)(B')]_n-Q[CY=C(Z)(Z)]$ or $[C(A)_2=C(B)]_n-Q[C(Y)(Y')—C(Z)(Z')]—X'$, where Q is either S or O. Oxygen may be incorporated, for example, by copolymerization with vinyl ethers such as $H_2C=CHOR$ wherein R=an alkyl. Sulfur may be incorporated, for example, by copolymerization with vinyl thioethers such as $H_2C=CHSR$ wherein R=an alkyl. Each of these reactions may be accomplished according to techniques conventionally known in the art. Most preferably, neither oxygen nor sulfur is present.

While it is expected that this telomer/monomer/macromonomer will have many applications, it is particularly of interest for the synthesis of PCTFE graft copolymers, which may be achieved by free radical polymerization according to a process much similar to the free radical telomerization process employed for synthesis of the telomer. In a first step, the $X—[C(A)_2C(B)(B')]_n—CY=C(Z)(Z')$ or $[C(A)_2=C(B)]_n—[C(Y)(Y')—C(Z)(Z')]—X'$ telomer is reacted with a CTFE monomer in the presence of a free radical initiator. This reaction polymerizes the CTFE monomer into PCTFE, which serves as a backbone component of a PCTFE graft copolymer, and where $X'—[C(A)_2C(B)(B)]_n—$ or $—[C(Y)(Y')—C(Z)(Z')]—X'$ pendant substituents are attached to the PCTFE backbone as the reaction proceeds. The pendant components are then crosslinked via the X or X' pendant end group with one or more crosslinking agents, completing synthesis of the PCTFE graft copolymer.

Like the exemplary telomerization reaction described above, the free radical graft polymerization reaction may be conducted in bulk without a solvent or in solution, emulsion (including a mini- or micro-emulsion), or suspension (including a mini- or micro-suspension), each with a solvent. Preferably, the process is conducted in emulsion or suspension with a solvent. The free radical polymerization reaction may be conducted in the same vessel or same type of vessel as the free radical telomerization reaction. In a preferred process, the reactor vessel is first charged with the $X—[C(A)_2C(B)(B')]_n—CY=C(Z)(Z')$ or $[C(A)_2=C(B)]_n—[C(Y)(Y')—C(Z)(Z')]—X'$ telomer, a solvent and a free radical initiator, after which the CTFE monomer is added. Preferably the solvent is pre-charged into the reactor vessel.

Any commercially available free radical initiator may be used for the radical polymerization of the graft copolymer, with redox initiator systems being most preferred. Similar to the free radical telomerization process employed for synthesis of the telomer, the free radical polymerization reaction between CTFE and the $X—[C(A)_2C(B)(B')]_n—CY=C(Z)(Z')$ or $[C(A)_2=C(B)]_n—[C(Y)(Y')—C(Z)(Z')]—X'$ telomer macromonomer is preferably conducted with an initial molar ratio of the $X—[C(A)_2C(B)(B')]_n—CY=C(Z)(Z')$ or $[C(A)_2=C(B)]_n—[C(Y)(Y')—C(Z)(Z')]—X'$ telomer macromonomer at a molar ratio of from about 1:5 to about 20:1, more preferably from about 1:1 to about 10:1, most preferably from about 1:1 to about 5:1.

Preferably, the initial molar ratio between the free radical initiator and the combination of CTFE and the telomer in the reaction vessel is at a monomer (combined):initiator molar ratio of from about 10:1 to about 10,000:1, more preferably from about 50:1 to about 1,000:1, and most preferably from about 100:1 to about 500:1. Similar to the telomerization reaction, the radical initiator is generally added incrementally over the course of the reaction, starting off with a rapid, initial charge of initiator provided to affect the onset of polymerization. In the initial charge, generally from about 10 ppm/min to about 1,000 ppm/min is added over a period of from about 3 minutes to about 30 minutes. This is followed by slow, incremental, continuous charging of initiator over a period of from about 1 hour to about 6 hours, or until polymerization has concluded. In the continuous charge, generally from about 0.1 ppm/min to about 30 ppm/min of initiator is added. The molar ratio of total monomer consumed (CTFE plus telomer) to radical initiator will depend upon the molecular weight desired. Any of the free radical initiators described herein for the telomerization reaction is useful for the graft copolymerization of the fluoropolymer. The most preferred free radical initiators for the graft copolymerization reaction are also 2,5-dimethyl-2,5-di(tert-butylperoxy)hexane, ditert butyl peroxide, and tert-butyl peroxypivalate.

The same solvents preferred for the telomerization reaction are preferred for both the graft polymerization reaction and for crosslinking the grafted telomer, including the FLUORINERT® family solvents from 3M Company, with the most preferred solvents being methyl acetate, acetonitrile, perfluoro-n-hexane, perfluoro-2-n-butyl-tetrahydrofuran, 1,1,1,3,3-pentafluorobutane, and a mixture of 1,1-dichloro-2,2,3,3-pentafluoropropane and 1,3-dichloro-1,1,2,2,3-pentafluoropropane. The quantity of solvent used in the reaction would be determinable by one skilled in the art and is preferably used in an amount of from about 30% to about 60% by weight based on the combined weight of the monomer and telomer reactants, the free radical initiator and the solvent, with co-solvents and surfactants similarly optional. When a co-solvent is present, the solvent preferably comprises from about 30% to about 70% by weight of the combined solvent and co-solvent. As stated above, emulsion and suspension polymerization processes generally use a reaction medium including water as a co-solvent in combination with an organic solvent, typically deionized, nitrogen-purged water. Accordingly, when water is present it is preferred that the reaction medium further comprise a surfactant as an emulsifier. As above, the surfactant when present preferably includes from greater than 0% to about 10% by weight of the solvent system, i.e. the weight of the solvent alone or of a combination of a solvent and a co-solvent, more preferably from greater than 0% to about 5% by weight, and most preferably from about 1% to about 3% by weight of the solvent system. As above, preferred surfactants are anionic surfactants, particularly perfluorinated anionic surfactants.

Preferred crosslinking agents non-exclusively include systems based on peroxides and triallylisocyanurate, particularly when the telomer/monomer/macromonomer contains atoms of iodine and/or of bromine in terminal position of the molecule (X or X'). Such peroxide-based systems are well known. The crosslinking agent is preferably employed at a concentration of from about 2% to about 20%, more preferably from about 3% to about 15% and most preferably from about 5% to about 15% based on the combined weight of the solids, i.e. the weight of the PCTFE backbone with telomer pendant chains.

The reaction temperatures for both the graft polymerization reaction and the crosslinking reaction are preferably from about 20° C. to about 250° C. Graft polymerization is more preferably conducted at a temperature of from about 55° C. to about 140° C. The crosslinking reaction is most preferably conducted at a temperature of from about 160° C. to about 240° C. Control of the reaction temperature is an important factor for controlling the final molecular weight of the PCTFE graft copolymer reaction product because elevated temperatures will yield greater reaction rates. During each reaction, the reaction vessel, e.g. an autoclave, is preferably maintained at an interior pressure of from about 1.5 bars (0.150 MPa) to about 100 bars (10 MPa), more preferably from about 3.5 bars (0.35 MPa) to about 55 bars (5.5 MPa), still more preferably from about 10 bars (1.0 MPa) to about 42 bars (4.2 MPa), and most preferably from about 20 bars (2.0 MPa) to about 35 bars (3.5 MPa). Elevated pressures will also yield greater reaction rates. While preferred, these temperature and pressure ranges are not intended to be strictly limiting. The polymerization is preferably conducted under agitation to ensure proper mixing, with the agitation rate being determined by one skilled in the art, typically being from about 5 rpm to about 800 rpm depending on the geometry of the agitator and the size of the vessel.

In addition, free radical polymerization may optionally take place in the presence of chain transfer agents. Examples of chain transfer agents are sulfhydryl compounds such as alkyl mercaptans, e.g. n-dodecyl mercaptan, tert-dodecyl mercaptan, thioglycolic acid and esters thereof, and mercaptoalkanols such as 2-mercaptoethanol. If employed, the quantity of chain transfer agents used is preferably from about 0% to about 5% by weight based on the combined weight of the monomers, more preferably from about 0.5% to about 2% by weight, and most preferably from about 0.1% to about 1.5% by weight based on the combined weight of the monomers. When used, chain transfer agents have a preferred chain transfer constant of from about 0.3 to about 3.0. However, polymerization in the absence of a chain transfer agent is most preferred.

Polymerization may also be catalyzed by using a transition metal accelerator in conjunction with the redox initiator system. Accelerators and catalysts can greatly reduce the polymerization time. Any commercially available transition metal may be used as an accelerator. Preferred transition metals include copper, silver, titanium, zinc, ferrous ion and mixtures thereof. Ferrous ion is most preferred. Optionally, polymerization may be further accelerated by including additional peroxide-based compounds in the redox initiator system. For example, from about 10 to about 10,000 ppm (parts per million), preferably from about 100 to about 5,000 ppm, of additional peroxide-based compound may be added to the vessel to accelerate polymerization. When an additional peroxide-based compound is used, it may be added at the same interval specified for the primary radical initiator or at a different interval as determined by one skilled in the art.

Crosslinking of the telomer pendant groups achieves the synthesis of PCTFE graft copolymers having a PCTFE backbone component and various pendant groups attached to said PCTFE backbone component. Such may also be referred to as poly(CTFE) graft copolymers, and may be represented by the general formula:

In a preferred embodiment, the PCTFE graft copolymer is PCTFE-g-PCTFE, having the formula:

In another preferred embodiment, the PCTFE graft copolymer is PCTFE-g-(poly)VDF (i.e., PCTFE-g-PVDF), having the formula:

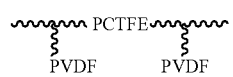

In yet another preferred embodiment, the PCTFE graft copolymer is PCTFE-g-(poly)BCTFB (i.e., PCTFE-g-BCTFB), having the formula:

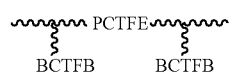

The PCTFE graft copolymers (for example, the PCTFE-g-PCTFE, PCTFE-g-PVDF, or PCTFE-g-BCTFB graft copolymers, as noted above) will have a PCTFE backbone length including one or more four-carbon chain units ($C_4$), typically having at least two ($C_8$) or three ($C_{12}$) four-carbon chain units, and the backbone will have at least one pendant group, preferably including from about 2 to about 20 pendant groups attached to said PCTFE backbone component. The structure and properties of the graft copolymer are directly controlled by the telomer from which it is formed, and such may be manipulated through modification of the telomer. In addition, the molecular weight of the graft copolymer may be increased by continuously adding monomers throughout the reaction, maintaining a continuous reaction as would be determined by one skilled in the art. When additional monomer is continuously added throughout the reaction, it is preferably added at a rate equal to the rate of consumption to maintain a constant vessel pressure. If desired, incremental additional charges of initiator may be introduced into the vessel over the duration of the reaction to sustain polymerization. The PCTFE graft copolymers may be recovered from the reaction vessel using conventional techniques in the art, such as filtration and drying or by precipitation. As with the telomer, other useful methods include evaporating or freeze-drying the solvents, precipitating the solids from the solvent/reaction product mixture with an agglomerating or coagulating agent such as ammonium carbonate, or liquid-liquid extraction, followed by filtration or centrifuging.

After recovery of the PCTFE graft copolymers, the copolymers may be combined with various additives depending upon the end use application. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall composition. Representative ultraviolet light stabilizers include various substituted resorcinols, salicylates, benzotriazoles, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benzylnesulfonamide, and combinations of any of the above, as well as other plasticizers known in the art.

The graft copolymers of the invention are particularly useful as films in the formation of articles such as packages, bags, pouches, containers and blister packages for the storage of food and medical products, or as lidding films on containers or trays. The graft copolymers are also useful for forming articles such as bottles, tubes and various other structures. Such articles are formed through well known techniques in the art. Films of the invention include monolayer films formed from the PCTFE graft copolymers as well as multi-layer films comprising, for example, at least one layer of a fluoropolymer, e.g. PCTFE homopolymer, attached to at least one layer of the PCTFE graft copolymer.

A monolayer film is preferably formed using well known extrusion techniques. In a multilayer film, the PCTFE graft copolymer layer or layers and any other layers are preferably attached to each other by coextrusion. For example, the polymeric material for the individual layers are fed into infeed hoppers of a like number of extruders, each extruder handling the material for one or more of the layers. The melted and plasticized streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passed around the first roll, and then fed onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017. The polymeric material may also be formed into tubes using techniques that are well known in the art, such as by extruding the polymeric material through an annular die.

Alternatively individual film layers in a multilayer film may first be formed as separate layers and then laminated together under heat and pressure. Lamination techniques are well known in the art. Typically, laminating is done by positioning the individual layers on one another under conditions of sufficient heat and pressure to cause the layers to combine into a unitary film. For example, the individual layers may be positioned on one another and the combination passed through the nip of a pair of heated laminating rollers by techniques well known in the art. Typically, lamination may be conducted with or without intermediate adhesive layers. In the preferred embodiment of this invention, no intermediate adhesive layer is used between the copolymer and fluoropolymer layers. Lamination heating may be done at temperatures ranging from about 120° C. to about 225° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

Films of the PCTFE graft copolymers may vary in thickness, but they are particularly desirable for having enhanced moisture barrier properties when formed as thin films. In the preferred embodiments, PCTFE-g-PCTFE films have a thickness of from about 1 µm to about 150 µm, more preferably from about 1 lam to about 100 µm, still more preferably from about 1 µm to about 50 µm, and most preferably from about 1 µm to about 10 µm. The thickness of multilayer films incorporating a PCTFE graft copolymer film of the invention will vary as determined by one skilled in the art. As an example, a PCTFE graft copolymer film of the invention maybe attached to a PCTFE fluoropolymer film, such as an ACLAR® PCTFE film, which is commercially available from Honeywell International Inc. of Morristown, N.J., having a thickness of from about 1 µm to about 150 µm, preferably from about 1 µm to about 100 µm and more preferably from about 10 µm to about 50 µm. While such thicknesses are preferred, it is to be understood that other film thicknesses may be produced to satisfy a particular need and yet fall within the scope of the present invention.

The moisture barrier of the PCTFE graft copolymer film of the invention is determined by measuring the water vapor transmission rate (WVTR) of the films via the procedure set forth in ASTM F1249. In the preferred embodiment, packages, films and articles formed from the PCTFE graft copolymer films of the invention have a WVTR of from about 0.0005 to about 1 gm/100 in$^2$/day of the overall film or article at 37.8° C. and 100% relative humidity (RH), preferably from about 0.001 to about 0.1 gm/100 in$^2$/day of the overall film or article, and more preferably from about 0.003 to about 0.05 gm/100 in$^2$/day. As is well known in the art, the water vapor transmission rate is directly influenced by overall film thickness. These ranges are based on monolayer PCTFE graft copolymer films having a thickness less than 150 µm, with a typical film thickness of from about 1 µm to about 50 µm.

EXAMPLES

The following non-limiting examples serve to illustrate the invention:

1. Br—CF$_2$CFCl—Br (Br—CTFE-Br)

Br—CF$_2$CFCl—Br (Br—CTFE-Br) was synthesized as reported in the literature. See J Guiot et al., "Synthesis and Copolymerization of Fluorinated Monomers Bearing a Reactive Lateral Group. XX. Copolymerization of Vinylidene Fluoride with 4-Bromo-1,1,2-trifluorobut-1-ene," 43 J. POLYMER SCI. PT. A: POLYMER CHEM. 917-35 (2005).

2. Radical Telomerization of CTFE with Br—CTFE-Br

The radical telomerization of CTFE with Br—CTFE-Br as a telogen was performed in a 600 ml autoclave, equipped with inlet and outlet valves, a manometer, and a rupture disk. This autoclave was degassed and pressurized with 20 bar of nitrogen to check for leaks. Then, a 0.004 mbar vacuum was operated for 30 min. Under vacuum, the nonvolatile reactants, telogen Br—CF$_2$—CFCl—Br (194.9 g, 0.72 mol.), C$_4$H$_5$F$_5$ (250 mL) and the initiator tert-butyl peroxypivalate (99.7 g, 0.43 mol., 50% relative to the CTFE) were transferred into the autoclave. The valve of the autoclave was closed and frozen in an acetone/liquid nitrogen mixture. Then, the required amount of CTFE (100 g, 0.86 mol., 1.2 equiv. relative to the Br—CF$_2$—CFCl—Br) was introduced into the mixture by doubled weighing. The autoclave was left to warm to room temperature, and then was progressively heated to 74° C., by carrying out a heating profile that included 2 min equilibrium at 40° C., 50° C., 60° C. and 70° C. An exotherm of ca. 18-30° C. (leading to a maximum pressure, P=11 bar) was observed, after which the pressure dropped to 3 bar. After 16 h reaction, the autoclave was placed in an ice bath for about 60 min (P=0-1 bar), and unreacted CTFE (35 g) was progressively released (CTFE conversion >60%). After opening the autoclave, the total product mixture was distilled and yielded 112 g. The total of fractions containing CTFE telomers was: 36.6 g of mixture (monoadduct and diadduct), 32.0 g of diadduct, and 43.0 g of n>2. The samples were characterized by $^{19}$F NMR spectroscopy.

NMR of Br(CTFE)$_2$Br Telomer

FIG. 1 illustrates the $^{19}$F NMR spectrum of Br—CF$_2$—CFCl—(CF$_2$—CFCl)$_n$—Br where n is greater than 5.

3. Dehalogenation of Br(CTFE)$_2$Br for the Synthesis of 4-Chloro-4-bromoperfluoro-1-butene (C$_4$Br$^{cTFE}$)

3.85 g (58.9 mmol 3.0 equivalent/telomer) of finely powdered Zn and 50 mL of THF were placed in a three-necked round bottom glass flask swept by an argon flow and equipped with a condenser maintained at 25° C. with a circulating water bath, a magnetic stir bar and a dropping funnel. Under vigorous stirring, the zinc was activated by few drops of bromine (Br$_2$). Then, the corresponding Br—CTFE-CTFE-Br telomer (10.0 g, 19.6 mmol) was added dropwise to the heterogeneous mixture. An exotherm of ca. 8-10° C. was observed. After, complete addition, the mixture was left reacting at 70° C. for 24 hours. Excess zinc was removed by flash chromatography and the zinc salts (ZnX$_2$, X═Cl, Br) by extracting the reaction mixture with dichloromethane followed by water. After evaporation of solvent and distillation under reduced pressure, 3.54 g of a colorless liquid was obtained (yield=46%) (CF$_2$═CF—CF$_2$CFClBr, C$_4$Br$^{cTFE}$).

NMR Spectroscopy of C$_4$Br$^{cTFE}$

Figure 2:
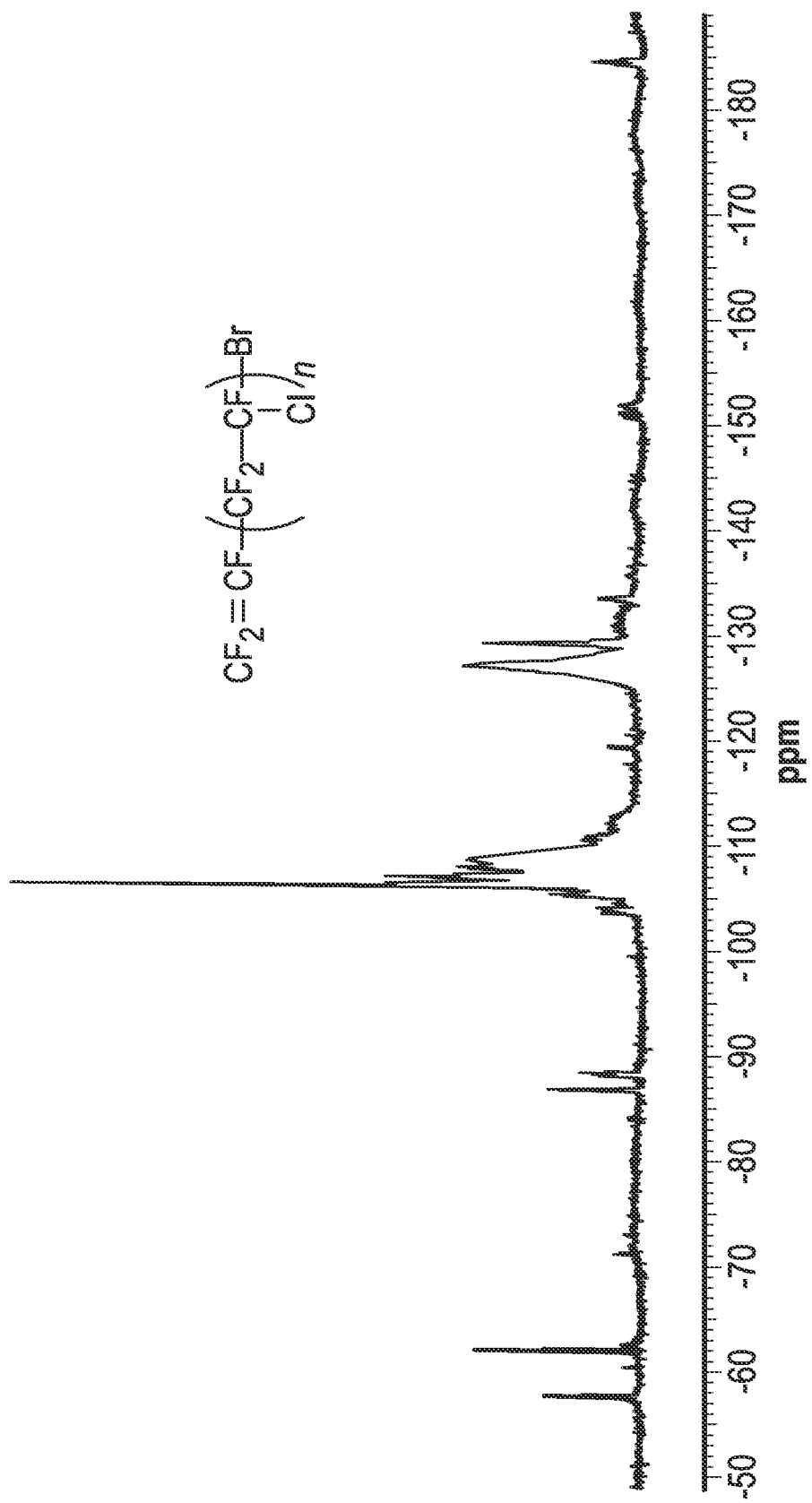
FIG. 2 illustrates the $^{19}F$ NMR spectrum of $CF_2=CF—(CF_2—CFCl)_n—Br$, where n is greater than 5, recorded in $CDCl_3$.

FIG. 2 illustrates the $^{19}$F NMR spectrum of CF$_2$═CF—(CF$_2$—CFCl)$_n$—Br where n is greater than 5.

4. Radical Copolymerization of CTFE with C$_4$Br$^{cTFE}$ (Procedure in Carrius Tubes)

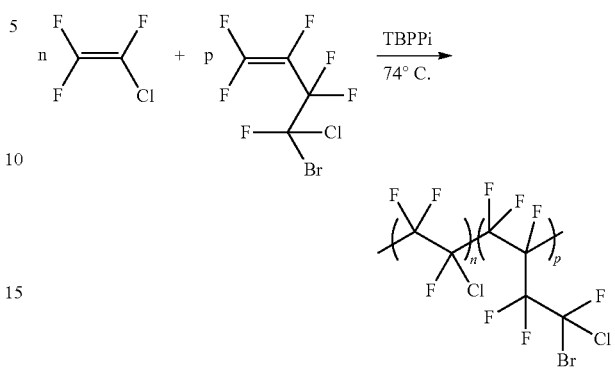

The reactions were performed in thick borosilicate Carrius tubes (length 130 mm, internal diameter 10 mm, thickness 2.5 mm; for a total volume of 8 cm$^3$). After the introduction of the tert-butyl peroxypivalate (38.5 mg, ~2.0 mol. % relative to the monomer), C$_4$Br (1.62 g, 5.6 mmol, 70 mol % in the feed) and C$_4$H$_5$F$_5$ (3.5 g), the tube was connected to a manifold and then cooled into liquid nitrogen. After five freeze-thaw cycles, the adequate CTFE gas quantity (0.28 g, 2.4 mmol, 30 mol % in the feed) was trapped in the tube cooled in liquid nitrogen under 20 mm Hg. To introduce the targeted CTFE quantities, a beforehand calibration was made to link the gas pressure (bars) to the introduced weight (g). The tube was sealed while immersed in liquid nitrogen and left stirred at 74° C. for 16 h. After the reaction, the tube was broken and the reaction mixture was then analyzed by $^{19}$F and $^1$H NMR spectroscopy. The copolymers were precipitated from cold pentane and dried until constant weight.

Figure 3:
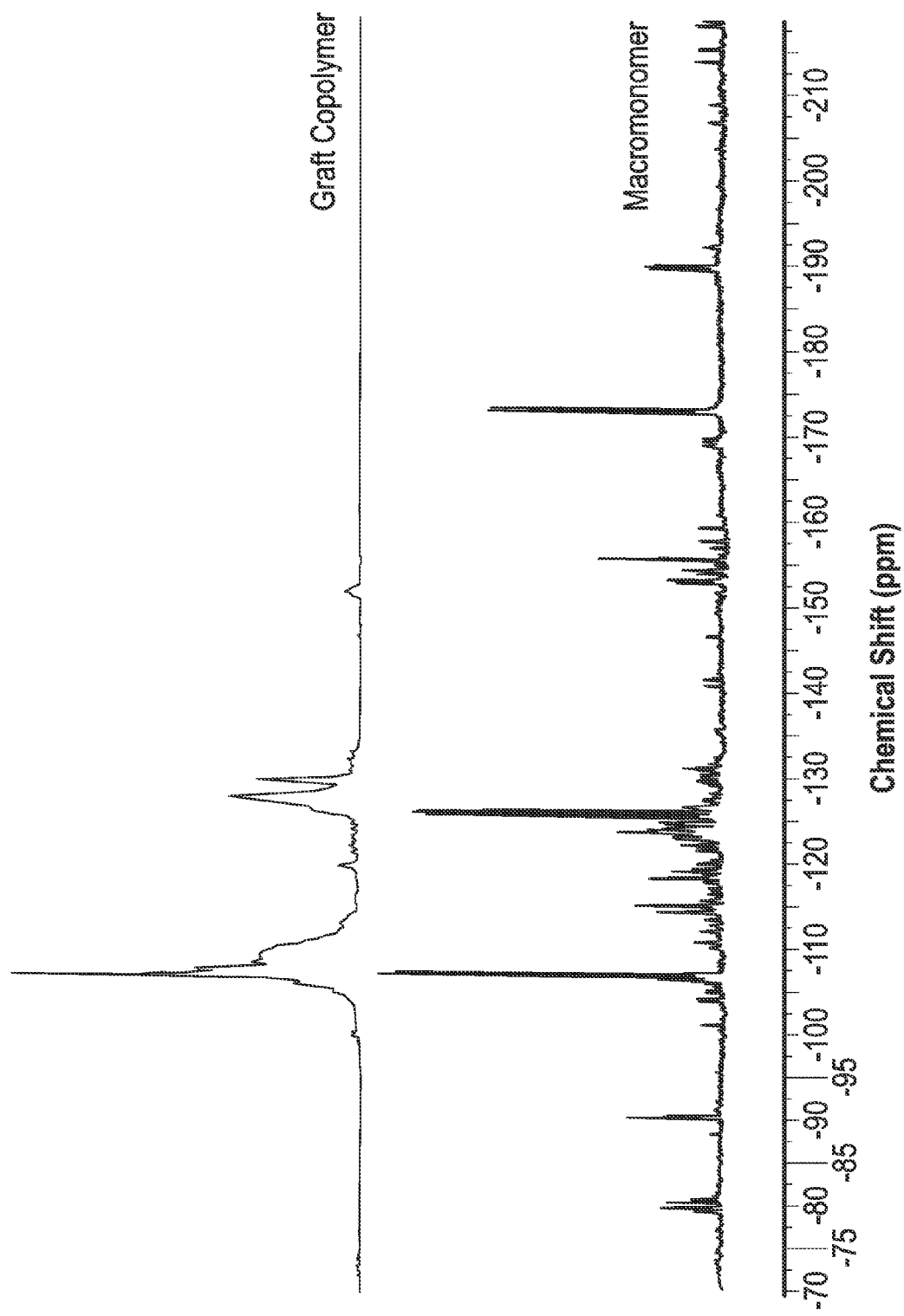
FIG. 3 illustrates the $^{19}F$ NMR spectrum of macromonomer $F_2C=CF—(CTFE)_n$-Br (lower spectrum), where n is greater than 5, and its copolymer with CTFE, i.e. PCTFE-g-PCTFE (upper spectrum).

NMR of P(CTFE-g-CTFE) Graft Copolymer $^{19}$F NMR (FIG. 3, CDCl$_3$, 20° C.) δ ppm: −62.5 (m, CF$_2$—CFCl—Br, 1F), −105 to −115 (m, —CF$_2$—CFCl—, 2F), −125 to −132 (m, —CF$_2$—CFCl—, 2F).

5. Synthesis of Telomers Br—[—VDF—]$_n$—(CTFE)-Br (n=1, 2)

Figure 4:
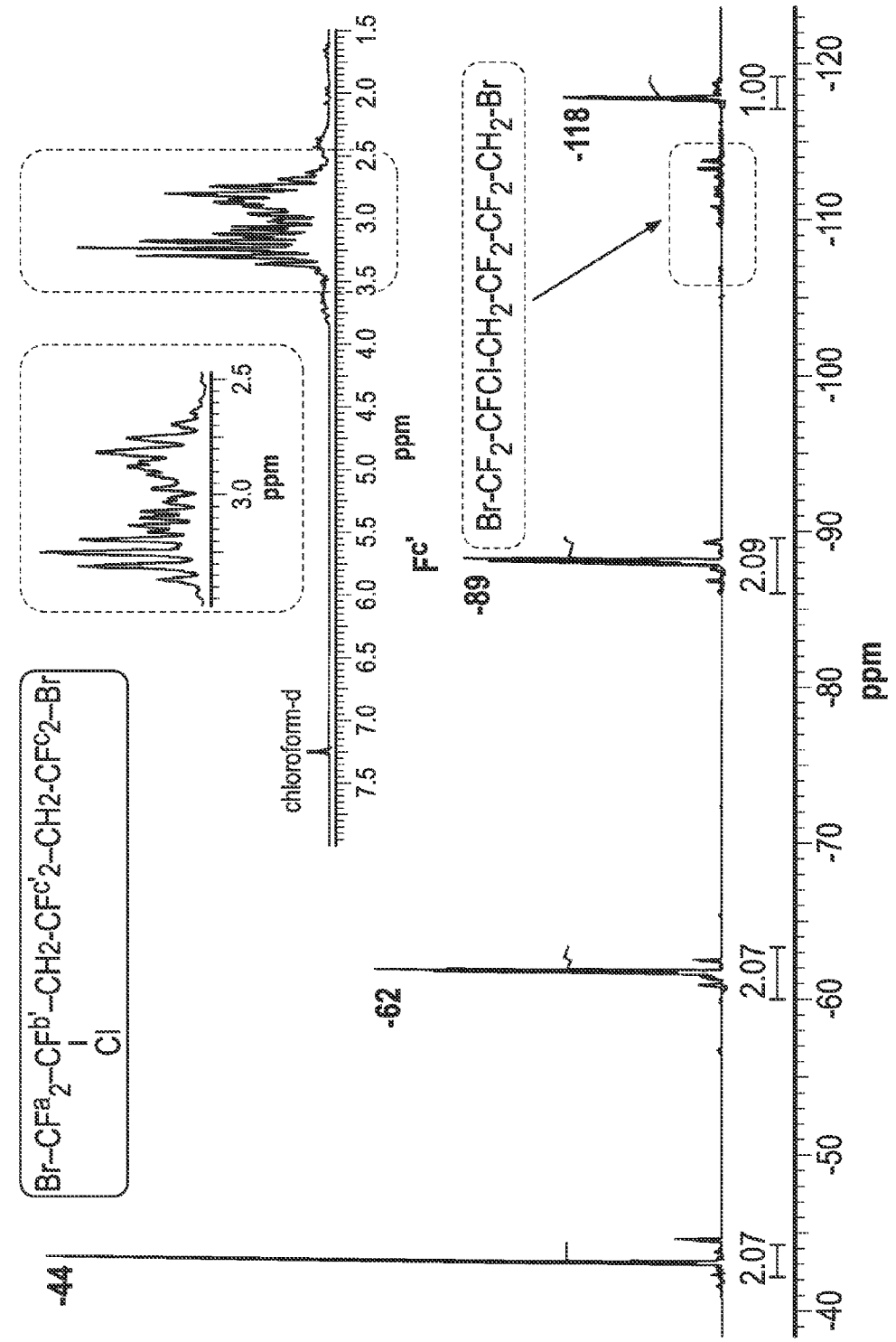
FIG. 4 illustrates the $^1H$ and $^{19}F$ NMR spectrum of telomer $Br—CTFE-(VDF)_2—Br$.

The telomerization of vinylidene fluoride (VDF) in the presence of 3 equivalents of Br—CTFE-Br (100% Br—CTFE-Br of recovered from last telomerization reaction) initiated by tert-butyl peroxypivalate (TBPPi) was carried out in C$_4$F$_5$H$_5$, with 17 g of VDF. This led to excellent VDF conversion (>99%). After reaction and elimination of the solvent, the $^1$H NMR spectrum of the crude product showed the presence of peaks characteristic of methylene units of VDF. The $^{19}$F NMR spectrum indicated that the product is a mixture of Br—CTFE-VDF—Br and Br—CTFE (VDF)$_2$—Br. Various liquid telomers with n=1, 2 were isolated by distillation that led to two interesting isolated fractions, one consisting of Br—CTFE-(VDF)—Br only, while the other contained Br—CTFE-(VDF)$_2$—Br with small traces of high molecular weight Br—CTFE-(VDF)$_n$—Br (n>2). Products Br—CTFE-(VDF)—Br and Br—CTFE-(VDF)$_2$—Br were isolated and the structures of the telomers were confirmed by $^{19}$F NMR spectroscopy (FIG. 4). Total of Fraction containing VDF telomers=51 g and the yield of the reaction was 57%.

6. Synthesis of an F$_2$C═CFCH$_2$CF$_2$Br Monomer (C$_4$ Monomer) Via Dehalogenation Four dehalogenation reactions of the fraction containing Br—CTFE-(VDF)$_n$—Br (n=1) were carried out in the presence of 1.5 equivalents of Zn in the presence of THF at 0° C.

Figure 5:
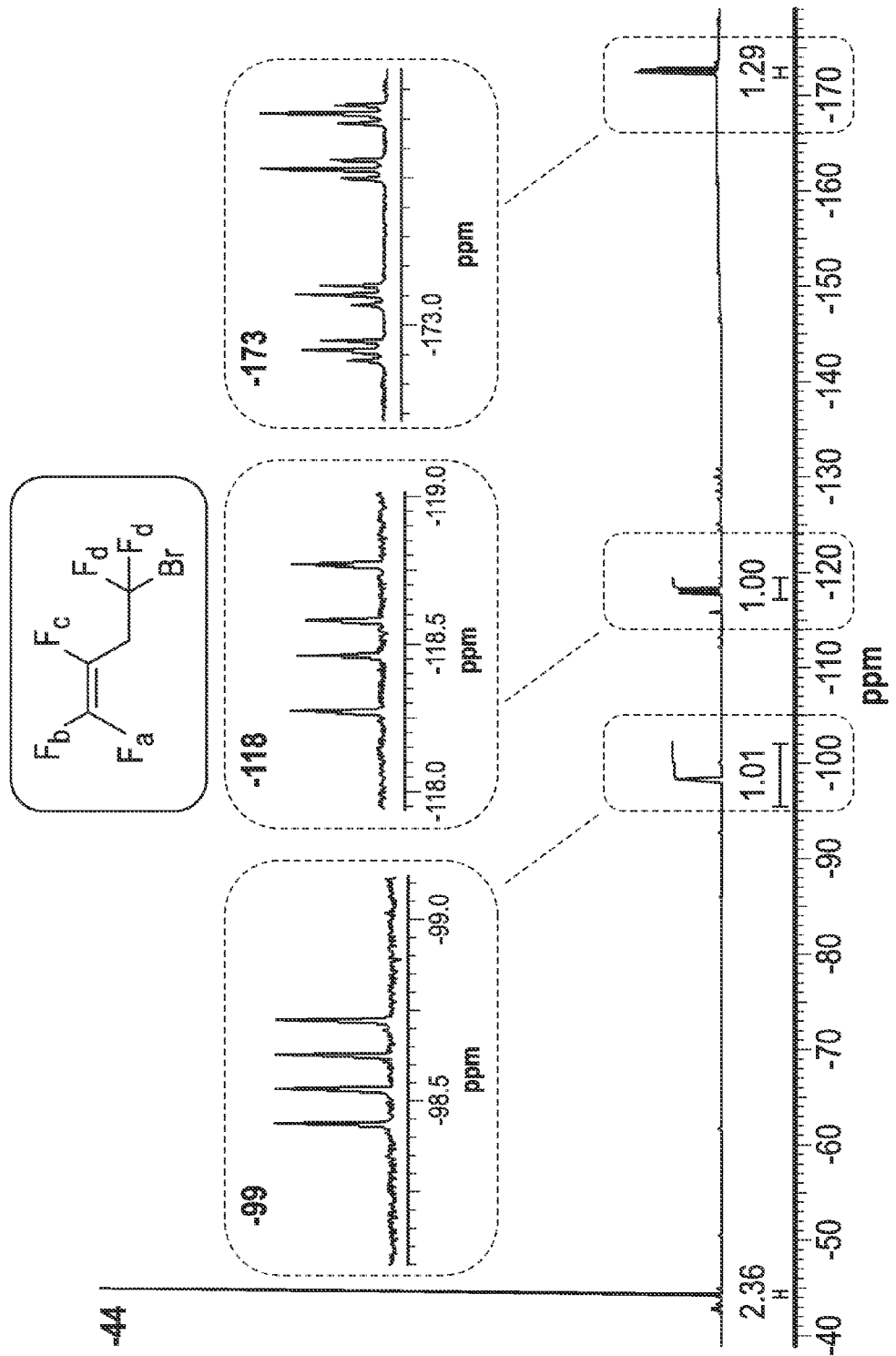
FIG. 5 illustrates the $^{19}F$ NMR spectrum of dehalogenated $F_2C=CFCH_2CF_2Br$ monomer.

Comparing the $^{19}$F NMR spectra before and after dehalogenation confirmed that the C$_4$ monomer was synthesized as evidenced by the doublets of doublets (of doublets) assigned to the 3 non-equivalent fluorine atoms in CF$_2$=CF— end group centered at −98, −118, and −173 ppm. This was concomitant to the disappearance of the peaks of the BrCF$_2$ between −60 and −65 ppm. The structure of product C$_4$Br was confirmed by $^1$H, $^{19}$F (FIG. 5) and $^{13}$C NMR spectroscopy. Optimum conditions for telomer dehalogenation are: a. Addition dropwise of Br—CTFE-(VDF)—Br at 0° C.; b. Solvent: THF (100% of conversion, 34-38% of yield); c. 1.5 equivalents of Zn; and d. Purification using vacuum distillation only.

7. Graft Radical Copolymerization of CTFE (and VDF) with C$_4$Br

Figure 6:
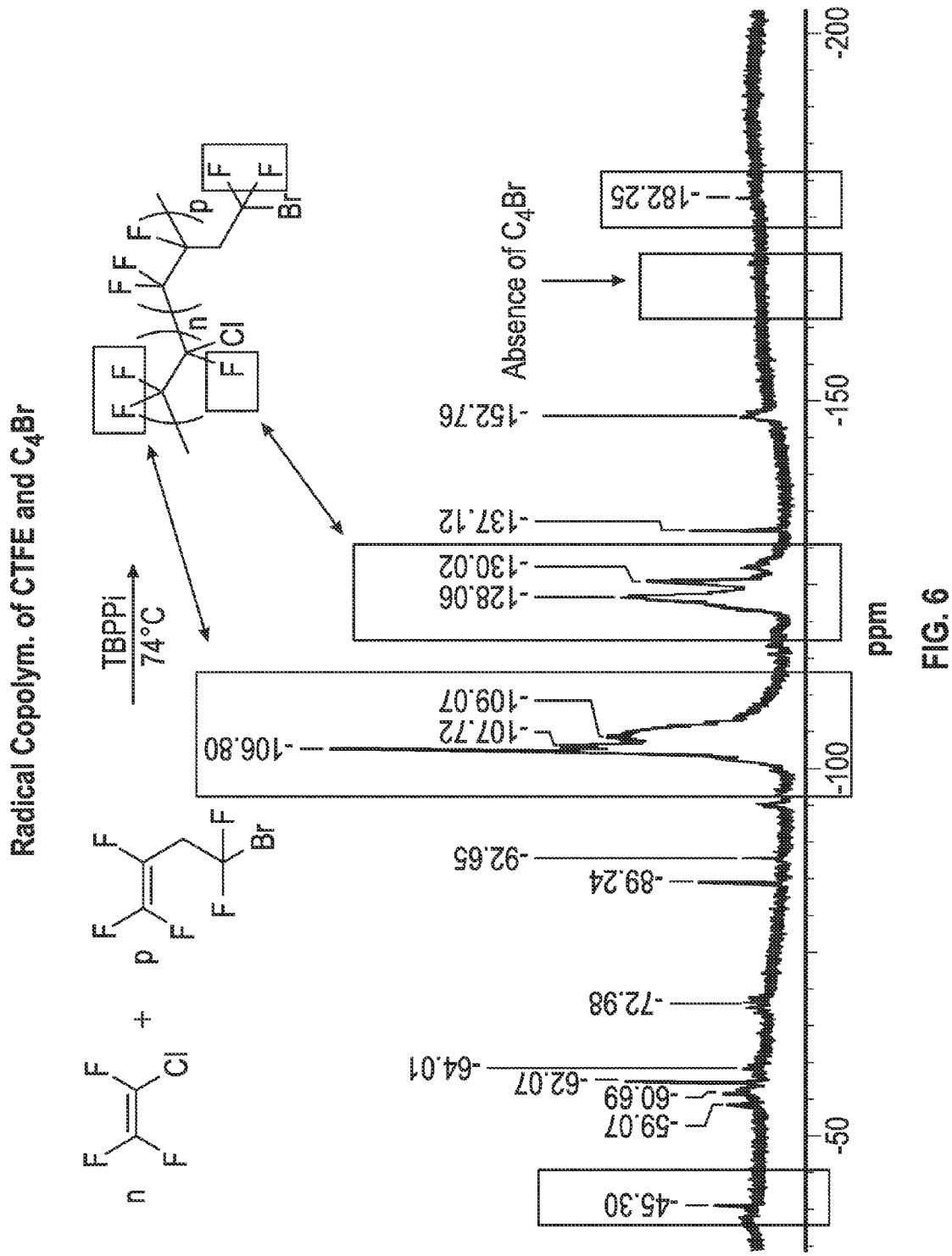
FIG. 6 illustrates the $^{19}F$ NMR spectrum of the graft radical copolymerization of CTFE with $C_4Br$.

Successful copolymerizations of CTFE with C$_4$Br monomer (containing 5-10% amount of THF) initiated by tert-butyl peroxypivalate (TBPPi) were carried out and led to PCTFE containing CF$_2$Br side—group—(white powder). With 5 mol % and 15 mol % C$_4$Br feed, the obtained copolymers were partially soluble in DMF (while PCTFE is totally insoluble) and insoluble in chloroform. In contrast, from 30 mol % C$_4$Br feed the obtained copolymer was soluble in chloroform and DMF. The $^{19}$F NMR spectrum of the obtained polymer indicated the presence of CTFE unit and the incorporation of C$_4$Br monomer as evidenced by the signal at −45 ppm and −182 ppm assigned to CF$_2$Br and CF respectively, and the absence of free C$_4$Br (peaks at −98, −118, and −173 ppm) (FIG. 6). The obtained polymer was also characterized by infrared spectroscopy, thermogravimetric analysis, and size-exclusion chromatography. The monomodal distribution evidences the formation of a copolymer and not a blend of PCTFE and copolymer.

8. Radical Copolymerization of CTFE (with BCTFB)

Figure 7:
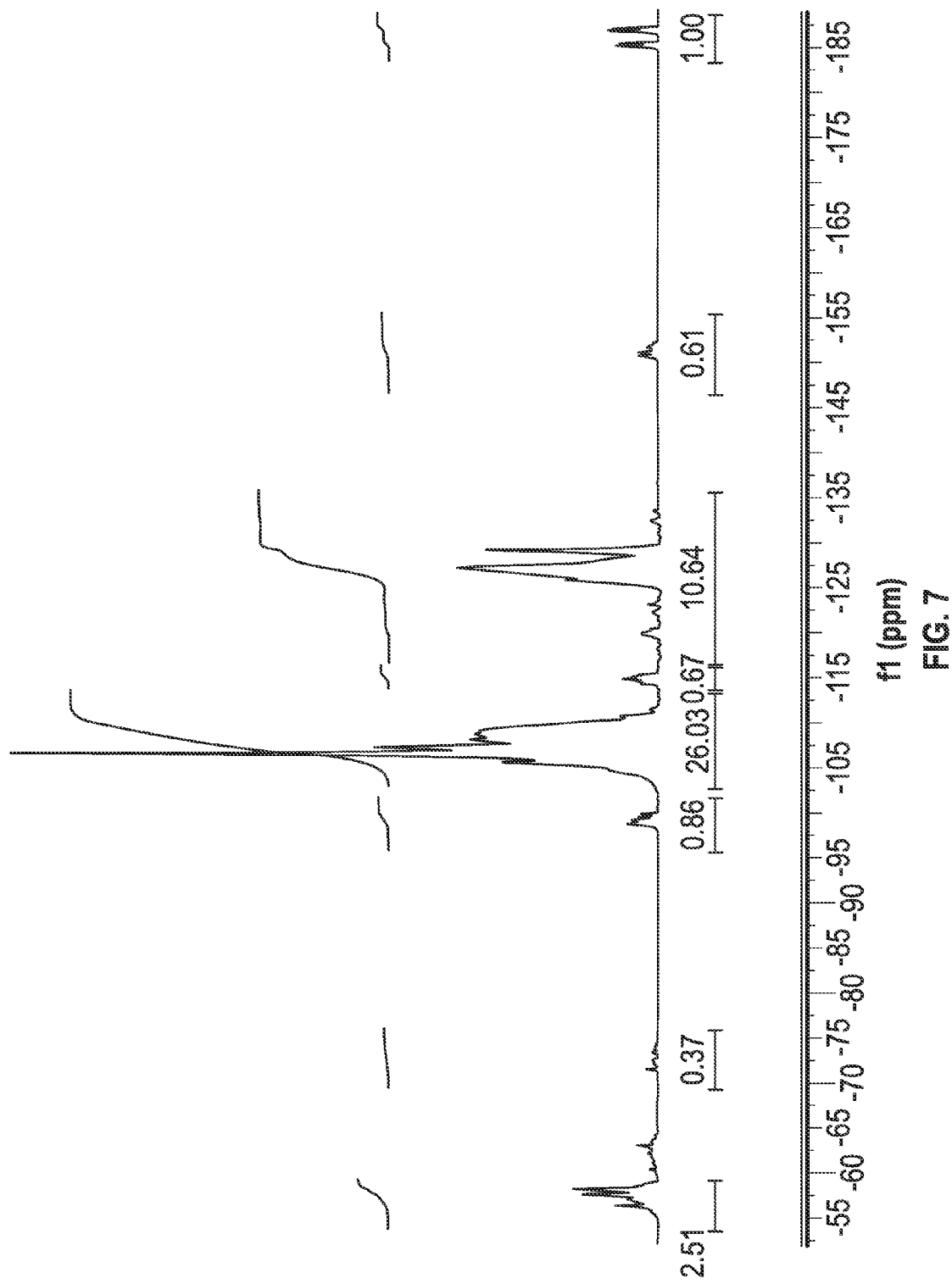
FIG. 7 illustrates the $^{19}F$ NMR spectrum of the graft radical copolymerization of CTFE with $Br—CF_2—CF(Cl)—CH=CH_2$.

A supply of BCTFB was obtained by reacting ethylene with dibrominated CTFE in 1,1,1,3,3-pentafluorobutane at 120° C. for 4 hours using a mixture of tert-butyl peroxypivalate (TBPPi, 3 mol %) and 2,5-bis(tert-butylperoxy)-2,5-dimethylhexane (Trigonox 101, 4.5 mol %) as radical initiators, with the resulting structure being Br—CF$_2$—CFCl—CH$_2$—CH$_2$—Br after distillation under vacuum. This was dehydrochlorinated with KOH in refluxing methanol for 15 hours, forming Br—CF$_2$—CFCl—CH=CH$_2$ (BCTFB). Successful radical copolymerization of CTFE (96 mol % in the feed) with BCTFB initiated by TBPPi (2 mol % with respect to both monomers) was carried out at 74° C. in a 100 mL autoclave. The $^{19}$F NMR spectrum of the obtained polymer is shown in FIG. 7.

While the invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A poly-chlorotrifluoroethylene (PCTFE) graft copolymer having a PCTFE backbone component and a plurality of polymeric pendant groups poly(M) attached to said PCTFE backbone component (PCTFE-g-poly(M)), wherein M is a monomeric unit of the polymeric pendant groups, and
wherein the monomeric unit M comprises chlorotrifluoroethylene and the polymeric pendant groups poly(M) comprise PCTFE.

2. The PCTFE-g-poly(M) graft copolymer of claim 1 comprising from about 2 to about 20 pendant groups attached to the PCTFE backbone component.

3. A film formed from the PCTFE-g-poly(M) graft copolymer of claim 1.

4. An article comprising the film of claim 3.

5. The PCTFE-g-poly(M) graft copolymer of claim 1 wherein the PCTFE backbone component comprises one or more four-carbon chain units.

6. The PCTFE-g-poly(M) graft copolymer of claim 1 wherein the PCTFE backbone component comprises at least two four-carbon chain units.

7. The PCTFE-g-poly(M) graft copolymer of claim 1 wherein the PCTFE backbone component comprises at least three four-carbon chain units.

8. A poly-chlorotrifluoroethylene (PCTFE) graft copolymer having a PCTFE backbone component and a plurality of polymeric pendant groups poly(M) attached to said PCTFE backbone component (PCTFE-g-poly(M)), wherein M is a monomeric unit of the polymeric pendant groups, and
wherein the monomeric unit M comprises vinylidenefluoride (VDF) and the polymeric pendant groups poly(M) comprise poly-vinylidenefluoride (PVDF).

9. The PCTFE-g-poly(M) graft copolymer of claim 8 comprising from about 2 to about 20 pendant groups attached to the PCTFE backbone component.

10. A film formed from the PCTFE-g-poly(M) graft copolymer of claim 8.

11. An article comprising the film of claim 10.

12. The PCTFE-g-poly(M) graft copolymer of claim 8 wherein the PCTFE backbone component comprises one or more four-carbon chain units.

13. The PCTFE-g-poly(M) graft copolymer of claim 8 wherein the PCTFE backbone component comprises at least two four-carbon chain units.

14. The PCTFE-g-poly(M) graft copolymer of claim 8 wherein the PCTFE backbone component comprises at least three four-carbon chain units.

15. A poly-chlorotrifluoroethylene (PCTFE) graft copolymer having a PCTFE backbone component and a plurality of polymeric pendant groups poly(M) attached to said PCTFE backbone component (PCTFE-g-poly(M)), wherein M is a monomeric unit of the polymeric pendant groups, and
wherein the monomeric unit M comprises 4-bromo-3-chloro-3,4,4-trifluoro-1-butene (BCTFB) and the polymeric pendant groups poly(M) comprise poly-(4-bromo-3-chloro-3,4,4-trifluoro-1-butene) (poly-BCTFB).

16. The PCTFE-g-poly(M) graft copolymer of claim 15 comprising from about 2 to about 20 pendant groups attached to the PCTFE backbone component.

17. A film formed from the PCTFE-g-poly(M) graft copolymer of claim 15.

18. An article comprising the film of claim 17.

19. The PCTFE-g-poly(M) graft copolymer of claim 15 wherein the PCTFE backbone component comprises one or more four-carbon chain units.

20. The PCTFE-g-poly(M) graft copolymer of claim 15 wherein the PCTFE backbone component comprises at least two four-carbon chain units.

* * * * *